(12) United States Patent
Dolgin

(10) Patent No.: US 9,915,728 B2
(45) Date of Patent: Mar. 13, 2018

(54) SUB-DIFFRACTION LIMIT RESOLUTION RADAR ARRAYS

(71) Applicant: RAYTHEON COMPANY, Waltham, MA (US)

(72) Inventor: Benjamin Dolgin, Springfield, VA (US)

(73) Assignee: RAYTHEON COMPANY, Waltham, MA (US)

( * ) Notice: Subject to any disclaimer, the term of this patent is extended or adjusted under 35 U.S.C. 154(b) by 355 days.

(21) Appl. No.: 14/592,516

(22) Filed: Jan. 8, 2015

(65) Prior Publication Data

US 2015/0198701 A1    Jul. 16, 2015

Related U.S. Application Data

(60) Provisional application No. 61/925,864, filed on Jan. 10, 2014.

(51) Int. Cl.
*H01Q 3/22* (2006.01)
*G01S 13/66* (2006.01)
(Continued)

(52) U.S. Cl.
CPC .............. *G01S 13/66* (2013.01); *G01S 13/42* (2013.01); *G01S 13/4463* (2013.01); *G01S 2013/0254* (2013.01)

(58) Field of Classification Search
CPC .......... G01S 13/003; G01S 15/04; G01S 3/22; G01S 13/882; G01S 7/03; H01Q 3/26;
(Continued)

(56) References Cited

U.S. PATENT DOCUMENTS 28,599 A * 6/1860 Toman .................... F04B 53/00
                                                   417/537
4,683,474 A * 7/1987 Randig ................ G01S 13/003
                                                   342/368

(Continued)

OTHER PUBLICATIONS http://en.wikipedia.org/wiki/Lorenz_beam, 5 pages, Dec. 31, 2014.

*Primary Examiner* — Bernarr E Gregory
*Assistant Examiner* — Nuzhat Pervin
(74) *Attorney, Agent, or Firm* — Lewis Roca Rothgerber Christie LLP

(57) ABSTRACT

A phased array radar configured to transmit two or more slightly misaligned beams, for improved angular resolution. The transmitting array is split into two or more subarrays that transmit slightly misaligned beams that may have a common carrier frequency and each of which has a different modulation. Each subarray may include alternate elements in the rows of the transmitting array, and alternate elements in the columns of the transmitting array. The width of each transmitted beam may be greater than or comparable to the diffraction-limited width, but the region in which the beams overlap may be significantly narrower than any of the transmitted beams. The reflected beam from a target contains one or more of the modulations of the transmitted beams, in proportions depending on the location of the target, and the extent to which it is illuminated by each beam.

20 Claims, 4 Drawing Sheets

(51) Int. Cl.
*G01S 13/42* (2006.01)
*G01S 13/02* (2006.01)
*G01S 13/44* (2006.01)

(58) Field of Classification Search
CPC ........ H01Q 21/22; H01Q 1/3233; A61B 8/14;
H04B 7/2041; F04B 53/00; H03K 9/08
USPC ......................................................... 342/368
See application file for complete search history.

(56) References Cited

U.S. PATENT DOCUMENTS

| | | | | |
|---|---|---|---|---|
| 5,233,358 | A * | 8/1993 | Murphy | H04B 7/2041 342/371 |
| 6,038,255 | A * | 3/2000 | Palmer | H03K 9/08 327/175 |
| 6,710,302 | B1 * | 3/2004 | Rennick | G01S 15/04 219/202 |
| 2004/0235528 | A1 * | 11/2004 | Korisch | H01Q 21/22 455/562.1 |
| 2005/0101867 | A1 * | 5/2005 | Johnson | A61B 8/14 600/459 |
| 2008/0117105 | A1 * | 5/2008 | Chen | G01S 3/22 342/427 |
| 2011/0279669 | A1 * | 11/2011 | Longstaff | G01S 13/882 348/135 |
| 2012/0068882 | A1 * | 3/2012 | Blachford | H01Q 1/3233 342/104 |
| 2012/0154203 | A1 * | 6/2012 | Vacanti | G01S 7/03 342/149 |

* cited by examiner

SUB-DIFFRACTION LIMIT RESOLUTION RADAR ARRAYS

CROSS-REFERENCE TO RELATED APPLICATION(S)

The present application claims priority to and the benefit of U.S. Provisional Application No. 61/925,864, filed Jan. 10, 2014, entitled "SUB-DIFFRACTION LIMIT RESOLUTION RADAR ARRAYS", the entire content of which is incorporated herein by reference.

BACKGROUND

1. Field

One or more aspects of embodiments according to the present invention relate to radar systems and more particularly to a system and method for obtaining improved angular resolution with a radar system transmitting multiple beams from a phased-array antenna.

2. Description of Related Art

Conventional radar systems may have angular resolution at or near the diffraction limit, which is approximately the ratio of the radar wavelength to the size of the transceiver array. Improving the angular resolution may entail using a short wavelength, and increasing the array size as needed to obtain a required angular resolution. Building and operating a large array may be costly, and, in some circumstances, e.g., on a vehicle or an aircraft, impractical because of space constraints. Thus, there is a need for a system and method for improving the angular resolution of a radar system without the need for a very large transceiver array.

SUMMARY

Aspects of embodiments of the present invention are directed toward a phased array radar configured to transmit two or more slightly misaligned beams, for improved angular resolution. The transmitting array is split into two or more sub arrays that transmit slightly misaligned beams that may have a common carrier frequency and each of which has a different modulation. Each subarray may include alternate elements in the rows of the transmitting array, and alternate elements in the columns of the transmitting array. The width of each transmitted beam may be greater than or comparable to the diffraction-limited width, but the region in which the beams overlap may be significantly narrower than any of the transmitted beams. The reflected beam from a target contains one or more of the modulations of the transmitted beams, in proportions depending on the location of the target, and the extent to which it is illuminated by each beam. The receiving array is phased to maximize the signal from the region in which the beams overlap.

According to an embodiment of the present invention there is provided a radar system, including: a transmitter and a receiver, the transmitter including a phased array antenna, the phased array antenna including a first subarray and a second subarray, the first subarray being configured to transmit a first radar beam having: a first direction, a first half-power beam width, and a first modulation, and the second subarray being configured to transmit a second radar beam having: a second direction, a second half-power beam width, and a second modulation, the angle between the first direction and the second direction being more than 1% of the average of the first half-power beam width and the second half-power beam width, and the first modulation being different from the second modulation, the receiver being configured to: receive a radar signal resulting from reflections, from a target, of the first radar beam and the second radar beam, measure the magnitude of the first modulation in the received radar signal, and measure the magnitude of the second modulation in the received radar signal.

In one embodiment, the receiver includes a phased array antenna, configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

In one embodiment, the receiving beam has a receiving beam width, the receiving beam width being substantially the same as the first beam width.

In one embodiment, the phased array antenna is configured to operate alternately as: a transmitting phased array antenna, and a receiving phased array antenna, wherein the receiving phased array antenna is configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

In one embodiment, the phased array antenna includes a rectangular array of array elements arranged in rows and columns, and the first subarray includes every other element of each row, and every other element of each column.

In one embodiment, the phased array antenna includes a third subarray configured to transmit a third radar beam having: a third direction, a third half-power beam width, and a third modulation, and the angle between the first direction and the third direction being more than 1% of the average of the first half-power beam width and the third half-power beam width, and the modulation of the first radar beam being different from the modulation of the third radar beam, the angle between the second direction and the third direction being more than 1% of the average of the second half-power beam width and the third half-power beam width, and the modulation of the second radar beam being different from the modulation of the third radar beam.

In one embodiment, the first modulation is orthogonal to the second modulation.

In one embodiment, the first modulation is on-off modulation, and the second modulation is on-off modulation that is complementary to the first modulation.

In one embodiment, the duty cycle of the first modulation is less than 50% and the duty cycle of the second modulation is greater than 50%.

In one embodiment, the first modulation is on-off modulation with a binary code.

In one embodiment, the binary code is a pseudorandom binary code.

In one embodiment, the first modulation is amplitude modulation with a square wave and the second modulation is amplitude modulation with a square wave.

In one embodiment, the first modulation is amplitude modulation with a sine wave and the second modulation is amplitude modulation with a sine wave.

In one embodiment, the first beam has a first carrier frequency, the second beam has a carrier frequency that is the same as the carrier frequency of the first beam, and the first modulation is on-off modulation with a binary code, and with a modulation rate of less than one-half of the carrier frequency.

In one embodiment, the angle between the first direction and the second direction is more than 30% of the average of the first half-power beam width and the second half-power beam width and less than 100% of the average of the first half-power beam width and the second half-power beam width.

According to an embodiment of the present invention there is provided a method for operating a radar system including a phased array antenna having a first subarray and a second subarray, the method including: transmitting, by the first subarray, a first radar beam having: a first direction, a first half-power beam width, and a first modulation, and transmitting, by the second subarray, a second radar beam having: a second direction, a second half-power beam width, and a second modulation, receiving a radar signal resulting from reflections, from a target, of the first radar beam and the second radar beam, measuring the magnitude of the first modulation in the received radar signal, and measuring the magnitude of the second modulation in the received radar signal.

In one embodiment, the receiving of the radar signal includes receiving the radar signal by a phased array antenna.

In one embodiment, the first modulation is orthogonal to the second modulation.

In one embodiment, the first modulation is on-off modulation, and the second modulation is on-off modulation that is complementary to the first modulation.

In one embodiment, the duty cycle of the first modulation is less than 50% and the duty cycle of the second modulation is greater than 50%.

DETAILED DESCRIPTION

The detailed description set forth below in connection with the appended drawings is intended as a description of exemplary embodiments of a sub-diffraction limit resolution radar array provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In conventional radar systems, the Rayleigh diffraction limit or "Rayleigh criterion" provides an estimate of the closest angular location of two uncorrelated sources, e.g., uncorrelated sources of electromagnetic radiation, that can be resolved using an ideal detector with a given entrance pupil. For a round pupil the limiting value of this limit is:

$$\sin\vartheta = 1.22\frac{\lambda}{D}$$

Because of the reciprocity of the characteristics of an antenna when transmitting and the characteristics of the antenna when receiving, a transmitted radar beam diameter may be constrained by a similar limit, e.g., the angular beam width may be given approximately by the ratio of the wavelength to the transverse size of the transmitting antenna.

Figure 1:
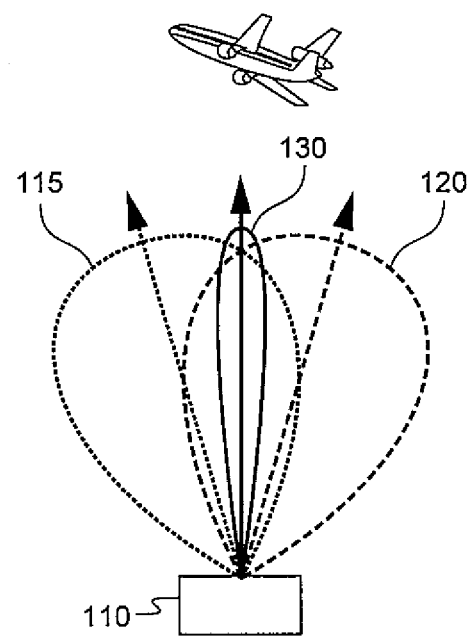
FIG. 1 is an antenna pattern diagram illustrating a first antenna pattern, a second antenna pattern, and an overlap beam, according to an embodiment of the present invention.

If the radar transmitter emits a composite beam including two or more overlapping beams, however, better angular resolution may be achieved, i.e., it may be possible to construct a sub-diffraction-limit radar system. Referring to FIG. 1, in one embodiment a radar transceiver 110 includes a transmitter that generates a first antenna pattern 115 with a first main lobe or first "beam" and a second antenna pattern 120 with a second main lobe or second beam; the first and second beams are misaligned. Each antenna pattern illustrated in FIG. 1 may be the radiant intensity, i.e., the far-field power per unit solid angle, shown in a polar plot as a function of angle. The antenna patterns illustrated in FIG. 1 are idealized for purposes of illustration and do not include side lobes. The first and second beams overlap, and the range of angles within which the transmitter transmits approximately the same radiant intensity in each of the beams may be referred to as an overlap beam 130. In this embodiment each of the first beam 115 and the second beam 120 may have a width comparable to the Rayleigh diffraction limit, and, as a result, they may be relatively broad, but the overlap beam 130 may be significantly narrower. Two misaligned beams may be produced, for example, by a reflector dish with two transmitting horns.

In one embodiment the first beam 115 is modulated with a first modulation, and the second beam 120 is modulated with a second modulation. For example, in a modulation scheme referred to herein as dot-dash modulation, the first modulation is on-off modulation with a duty cycle of less than 50% (i.e., "dots"), and the second modulation is complementary on-off modulation, i.e., on-off modulation with a duty cycle greater than 50%, i.e., "dashes", and with a phase such that the second beam is off whenever the first beam is on, and the second beam is on whenever the first beam is off, so that one of the two beams is on at any time.

A receiver in the radar transceiver may receive radar radiation reflected from a target. A target that is within only the first beam will reflect radar radiation from only the first beam, and a target that is within only the second beam will reflect radar radiation from only the second beam. A target that is within the overlap beam 130 (i.e., a target that is within both the first beam and the second beam) will reflect radar radiation from both transmitted beams, in proportions depending on the target's location within the overlap beam 130. For example, the radar radiation reflected to the receiver by a target that is nearer to the center of the first beam than to the center of the second beam may contain a greater proportion of radar radiation of the first beam than of the second beam.

Figure 2A:
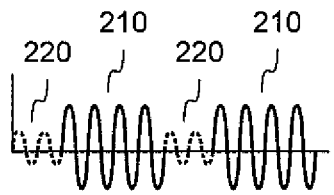
FIG. 2A is a waveform diagram illustrating received reflected radar radiation from a target in a first location, according to an embodiment of the present invention.
Figure 2B:
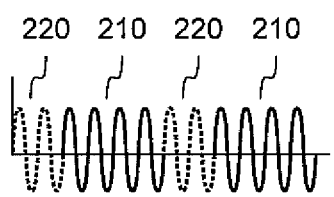
FIG. 2B is a waveform diagram illustrating received reflected radar radiation from a target in a second location, according to an embodiment of the present invention.
Figure 2C:
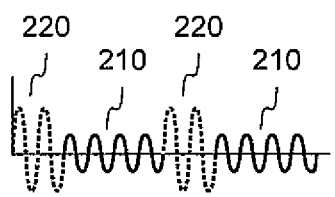
FIG. 2C is a waveform diagram illustrating received reflected radar radiation from a target in a third location, according to an embodiment of the present invention.

Thus the radar radiation reflected from the target may contain two components, a first reflected component that is due to reflection, by the target, of the first beam, and a second reflected component that is due to reflection, by the target, of the second beam; each component carries the corresponding modulation. If the target is in a first location nearer to the center of the second beam than to the center of the first beam, for example, the radar radiation reflected from the target contains the second modulation ("dashes" 210) with a magnitude that is greater than that of the first modulation ("dots" 220), as illustrated in FIG. 2A. If the target is in a second location equally close to the center of the first beam and to the center of the second beam, the radar radiation reflected from the target contains the first modulation and the second modulation, with the same magnitude, as illustrated in FIG. 2B. If the target is in a third location nearer to the center of the first beam than to the center of the second beam, the radar radiation reflected from the target contains the first modulation with a magnitude that is greater than that of the second modulation, as illustrated in FIG. 2C. The receiver is configured to distinguish, in the radar radiation reflected by the target, the first and second modulations, and to infer, from the relative magnitudes of these modulations, the direction to the target. For example, if the magnitude of the second modulation in the radar radiation reflected from the target is slightly larger than the magnitude of the first modulation in the radar radiation reflected from the target, the receiver may infer that the target is within the overlap beam 130, and that the target is offset from the center of the overlap beam 130 by a small angle in the direction of the second beam. In one embodiment, the direction to the target may be measured or estimated with a resolution 1000 times better than the Rayleigh criterion.

The estimated direction to the target, or estimated "target angle" may also be affected by characteristics of the target. A target that has directional reflectivity may introduce an error into the estimated angle, by producing larger or smaller reflections of the second beam relative to the first beam than it would if its reflectivity were omnidirectional. In one embodiment this error is less than, or of order, the width of the overlap beam 130.

The system may display the estimated target angle to an operator, or use it for subsequent processing or control, e.g., the system may track the target by continuously steering the transceiver in the direction of the target, determined from the difference between the magnitude of the first modulation in the received radar signal and the magnitude of the second modulation in the received radar signal. This may be accomplished, for example, by steering the transceiver in the direction of the beam producing the stronger reflections. The angle between the center of the overlap beam and the target may be estimated by multiplying this difference by a scaling factor, or the estimated angle may be a different function, e.g., a nonlinear function of this difference. If the target is outside of the overlap beam 130 by a sufficiently large angle that the measured magnitude of one of the modulations is too small, in the received radar radiation, to be distinguished from zero, then the system may discard the measurement, i.e., exclude it from further processing, or the system may steer the antenna gradually toward the target until both modulations have a measured magnitude in the received radar radiation that significantly exceeds zero. The radar system may have a steering apparatus, such as an azimuth-elevation mount, for steering the transmitter and the receiver, or for steering the antennas.

The first and second modulation may be selected to be orthogonal. If each of the beams carries a signal S that is a function of the radar carrier C and modulation signal M so that $$S=F(C,M)$$

and $$M=F^{-1}(S,C)+\text{error}$$

where F and $F^{-1}$ are modulation and demodulation functions, and if the modulation is linear, then $$F^{-1}(F(C,M_1)+F(C,M_2))=M_1+M_2+\text{error}$$

where error is small.

Orthogonality in the time domain, as used herein, means that $$\int_{t-T}^{t} M_1 \cdot M_2 \cdot dt = 0$$

As mentioned above, the first and second modulation may be dot-dash modulation. In other embodiments, the modulations consist of on-off modulation with two 50% duty cycle modulation waveforms, separated by 180 degrees, or amplitude modulation with square waves or with sine waves separated by 90 degrees, or complementary on-off modulation with a binary code, e.g., a pseudorandom binary code. In yet other embodiments, the first and second modulation may also, or instead, be orthogonal in the frequency domain or space domain, e.g., the modulations may consist of frequency modulation, or spatial modulation (e.g., the directions of the first and second beams may be modulated).

On-off modulation with a binary code may be employed at bit rates up to one-half of the radar carrier frequency. In a pulsed radar system, each pulse may contain a "word" of several bits of the binary code; the word may be sixteen bits in length.

In one embodiment, the receiver employs conventional radar processing to determine the range to the target. For example, if the radar operates in a pulsed mode, the receiver measures the time delay or "round trip delay" between the transmission of the pulse and the reception, at the receiver, of the pulse after reflection from the target. If the radar operates in a continuous wave (CW) mode, the phase difference between the transmitted wave and the received wave is used to estimate the distance to the target, from which the round trip delay may be inferred. Once the round trip delay is known, for the exemplary types of amplitude modulation listed above, the magnitude of a modulation (e.g., the first or second modulation) in the received radar radiation may then be obtained by delaying the modulation by the round trip delay, and correlating the delayed modulation with the received signal. The correlation may be performed by performing a frequency conversion on the received signal, e.g., down-converting the received radar signal to baseband, and then multiplying frequency-converted signal by the delayed modulation, averaging the product over time, and taking the absolute value. The averaging may be performed over several pulses in a pulsed radar system. In other embodiments the magnitudes of the first and second modulations may be measured using signal processing at an intermediate frequency (IF) instead of at baseband.

The modulations may not be perfectly orthogonal, e.g., as a result of imperfections in circuitry generating the modulations and applying them to the radar carrier, and the sensitivity of the system may be correspondingly reduced.

The antenna patterns of the first beam and the second beam and the misalignment angle between the first beam and the second beam may be selected or adjusted for good sensitivity in the measurement of the target angle. The sensitivity may be better if each of the first beam and the second beam has a sharp edge (i.e., radiant intensity changing rapidly with angle) within the overlap beam 130, so that the difference between the magnitude of the first modulation and the magnitude of the second modulation in the received beam changes rapidly with target angle. The sensitivity may also be better if both beams have high radiant intensity within the overlap beam 130, so that the radar radiation reflected from the target generates a signal in the receiver that is well above the receiver noise floor. In one embodiment the misalignment angle is 1% of the beam width, where the beam width or "half-power beam width" is defined as the angle between the directions at which the radiant intensity of the antenna pattern is 3 dB less than (i.e., one-half of) the radiant intensity at the peak of the antenna pattern. The direction of the beam is defined to be the direction corresponding to the peak of the antenna pattern, i.e., the direction in which the antenna pattern has maximum radiant intensity. In another embodiment the misalignment angle is greater than 1% of the half-power beam width, e.g., approximately one-half of the half-power beam width, as illustrated in FIG. 1. In one embodiment each antenna pattern is designed to be relatively flat over a range of angles and to drop sharply on one or both sides of the beam.

The antenna pattern of a receiving antenna may have a main lobe referred to as the "receiving beam". The receiving beam has a half-power beam width equal to the angle between the directions at which the output power, at the output of the receiving antenna, for constant incident irradiance (i.e., constant power per unit area), is half of the peak output power. The receiving beam direction is defined as the direction of the peak of the antenna pattern, i.e., the direction in which the output power, for constant incident irradiance, is maximum. The receiving antenna may be aligned so that the receiving beam direction is the center of the overlap beam, so that the system's sensitivity for targets in the overlap beam is high as a result of the target being illuminated by both the first beam and the second beam, and as a result of the receiver having relatively high sensitivity in the direction of the overlap beam.

Figure 3:
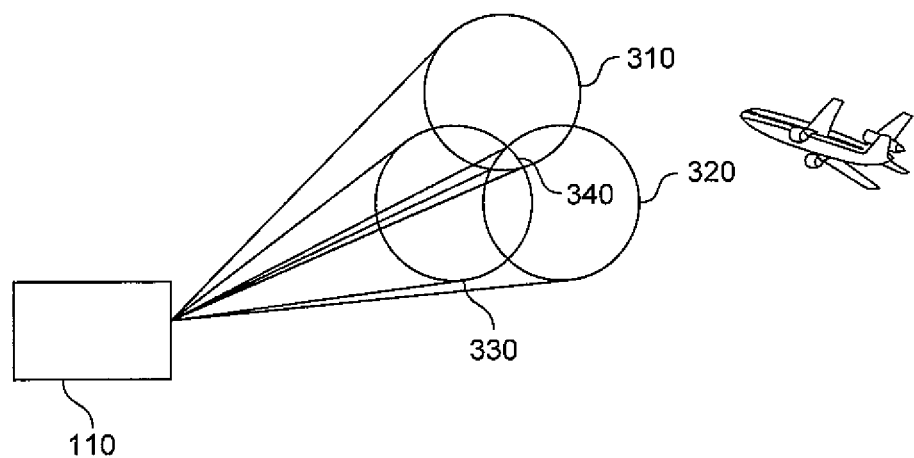
FIG. 3 is a diagram illustrating high resolution measurement of the direction to a target in bearing and elevation, according to an embodiment of the present invention.

Referring to FIG. 3, in one embodiment a third beam 310 is employed to enable the system to measure two angles, e.g., bearing or "azimuth", and elevation. For example, the second beam 320 may be slightly misaligned in azimuth or bearing from the first beam 330, and the third beam 310 may be slightly misaligned in elevation from the first beam 330. In other embodiments the misalignments may be other combinations of azimuth and elevation misalignments. In such a system three modulations may be applied to the three beams, and the three modulations may be mutually orthogonal. In one embodiment the modulation in each beam is on-off modulation with a duty cycle of ⅓, and the three modulations are offset in phase by 120 degrees. In other embodiments more than three separately modulated beams may be used; for example, four beams may be used, with a second beam misaligned from a first beam in elevation, and a third and a fourth beam misaligned from the first beam in both elevation and azimuth, so that, e.g., the four directions of the four beams form a diamond or a square on the surface of a unit sphere.

Each of the transmitted beams may be produced by a separate antenna, and another separate antenna may be used as the receiving antenna, or two or more of these antennas may have shared elements. For example, as mentioned above, a single dish reflector may have two or more transmitting horns; such a dish reflector may also have a receiving horn.

Figure 4:
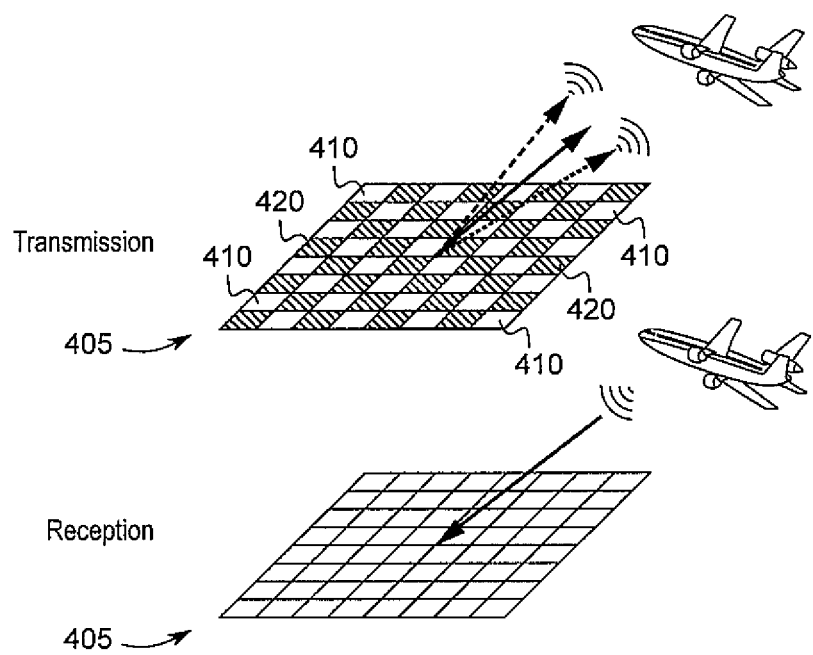
FIG. 4 is a diagram illustrating the operation of a phased array antenna to transmit two beams from sub arrays of the antenna, according to an embodiment of the present invention.

Referring to FIG. 4, one or more phased array antennas 405 may be used to build a system according to embodiments of the present invention. As used herein, a phased array antenna is a transmitting or receiving system that includes two or more transmitting or receiving array elements that are driven with, or configured to receive, coherent signals. A phased array antenna may consist of an array of elements connected with a splitter/combiner network, or it may include additional components such as power amplifiers, low-noise amplifiers, active gain and phase control circuits, and digital circuits for controlling gain and phase control circuits. A square phased array antenna may be used for transmitting, for example, with a first subarray transmitting the first beam and a second subarray transmitting the second beam. The first subarray may consist of some, e.g., half, of the elements, and the second subarray may consist of the remaining array elements. In one embodiment the elements 410 of the first subarray include every other element in each row and every other element in each column, so that the elements of the first subarray and the elements 420 of the second subarray form a checkered pattern on the array. Each of the transmitting subarrays may be driven with phasing that causes it to radiate a beam with a width near the Rayleigh diffraction limit, and the phasing of the subarrays may differ in a manner that causes the transmitted beams to be misaligned. If a phased array antenna is used, then instead of employing a steering apparatus to steer the beams, the phasing of the elements may be adjusted in real time to steer the beams, e.g., in the direction of the target, while maintaining the angles between the beams fixed or constant.

The receiving array may be the same array or it may be a separate array, with phasing such that the receiving antenna pattern includes the overlap beam 130. More than two beams may be transmitted with a phased array antenna, e.g., by dividing the phased array into more than two subarrays. Thus, the transmitter and receiver of the radar system may share some components, such as a phased array antenna, or, for example, a dish reflector used by both transmitting and receiving horns.

The amplitude of the reflected signal from a small object in conventional and sub-diffraction-limit radar may be comparable, and the detection range for small objects in sub-diffraction-limit radar may be comparable to or slightly less than that of conventional radar.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is, not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a sub-diffraction limit resolution radar array have been specifically described and illustrated herein, many modifications and variations will be apparent to those skilled in the art. Accordingly, it is to be understood that a sub-diffraction limit resolution radar array employed according' to principles of this invention may be embodied other than as specifically described herein. The invention is also defined in the following claims, and equivalents thereof.

What is claimed is:

1. A radar system, comprising:
a transmitter and a receiver,
the transmitter comprising a phased array antenna, the phased array antenna comprising a first subarray and a second subarray,
the first subarray being configured to transmit a first radar beam having:
a first direction,
a first half-power beam width, and
a first modulation, and
the second subarray being configured to transmit a second radar beam having:
a second direction,
a second half-power beam width, and
a second modulation,
the angle between the first direction and the second direction being more than 1% of the average of the first half-power beam width and the second half-power beam width, and the first modulation being different from the second modulation,
the receiver being configured to:
receive a radar signal resulting from reflections, from a target, of the first radar beam and the second radar beam,
measure the magnitude of the first modulation in the received radar signal,
measure the magnitude of the second modulation in the received radar signal, and
determine, from the magnitude of the first modulation in the received radar signal and from the magnitude of the second modulation in the received radar signal, a direction to a target.

2. The system of claim 1, wherein the receiver comprises a phased array antenna, configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

3. The system of claim 2, wherein the receiving beam has a receiving beam width, the receiving beam width being substantially the same as the first beam width.

4. The system of claim 1, wherein the phased array antenna is configured to operate alternately as:
a transmitting phased array antenna, and
a receiving phased array antenna,
wherein the receiving phased array antenna is configured to provide a receiving beam having a receiving beam direction, the angle between the receiving beam direction and the first direction being less than the angle between the first direction and the second direction, and the angle between the receiving beam direction and the second direction being less than the angle between the first direction and the second direction.

5. The system of claim 1, wherein the phased array antenna comprises a rectangular array of array elements arranged in rows and columns, and the first subarray comprises every other element of each row, and every other element of each column.

6. The system of claim 1, wherein:
the phased array antenna comprises a third subarray configured to transmit a third radar beam having:
a third direction,
a third half-power beam width, and
a third modulation, and
the angle between the first direction and the third direction being more than 1 of the average of the first half-power beam width and the third half-power beam width, and the first modulation being different from the third modulation, the angle between the second direction and the third direction being more than 1% of the average of the second half-power beam width and the third half-power beam width, and the second modulation being different from the third modulation.

7. The system of claim 1, wherein the first modulation is orthogonal to the second modulation.

8. The system of claim 7, wherein the first modulation is on-off modulation, and the second modulation is on-off modulation that is complementary to the first modulation.

9. The system of claim 8, wherein a duty cycle of the first modulation is less than 50% and a duty cycle of the second modulation is greater than 50%.

10. The system of claim 8, wherein the first modulation is on-off modulation with a binary code.

11. The system of claim 10, wherein the binary code is a pseudorandom binary code.

12. The system of claim 7, wherein the first modulation is amplitude modulation with a square wave and the second modulation is amplitude modulation with a square wave.

13. The system of claim 7, wherein the first modulation is amplitude modulation with a sine wave and the second modulation is amplitude modulation with a sine wave.

14. The system of claim 1, wherein:
the first beam has a first carrier frequency,
the second beam has a carrier frequency that is the same as the carrier frequency of the first beam, and
the first modulation is on-off modulation with a binary code, and with a modulation rate of less than one-half of the carrier frequency.

15. The system of claim 1, wherein the angle between the first direction and the second direction is more than 30% of the average of the first half-power beam width and the second half-power beam width and less than 100% of the average of the first half-power beam width and the second half-power beam width.

16. A method for operating a radar system comprising a phased array antenna having a first subarray and a second subarray, the method comprising:
transmitting, by the first subarray, a first radar beam having:
a first direction,
a first half-power beam width, and
a first modulation, and
transmitting, by the second subarray, a second radar beam having:
a second direction,
a second half-power beam width, and
a second modulation,
the angle between the first direction and the second direction being more than 1% of the average of the first half-power beam width and the second half-power beam width,
receiving a radar signal resulting from reflections, from a target, of the first radar beam and the second radar beam,
measuring the magnitude of the first modulation in the received radar signal, and
measuring the magnitude of the second modulation in the received radar signal, and
determining, from the magnitude of the first modulation in the received radar signal and from the magnitude of the second modulation in the received radar signal, a direction to a target.

17. The method of claim 16, wherein the receiving of the radar signal comprises receiving the radar signal by a phased array antenna.

18. The method of claim 16, wherein the first modulation is orthogonal to the second modulation.

19. The method of claim 18, wherein the first modulation is on-off modulation, and the second modulation is on-off modulation that is complementary to the first modulation.

20. The method of claim 19, wherein a duty cycle of the first modulation is less than 50% and a duty cycle of the second modulation is greater than 50%.

\* \* \* \* \*